United States Patent [19]

Fitter

[11] Patent Number: 4,897,626
[45] Date of Patent: Jan. 30, 1990

[54] COOLING ELECTROMAGNETIC DEVICES

[76] Inventor: Johan C. Fitter, 51 Mount Street, Bryanston, Transvaal, South Africa

[21] Appl. No.: 264,665

[22] Filed: Oct. 28, 1988

[30] Foreign Application Priority Data

Oct. 28, 1987 [ZA] South Africa .................. 87/8086

[51] Int. Cl.⁴ .................. H01F 27/08; H01F 17/06
[52] U.S. Cl. .................................. 336/61; 336/83;
    336/69, 83, 213, 178, 233, 55
[58] Field of Search .............. 336/61, 174, 175, 212,
    336/69, 83, 213, 178, 253, 55

[56] References Cited

U.S. PATENT DOCUMENTS

| | | | |
|---|---|---|---|
| 2,769,962 | 11/1956 | Melville | 336/61 |
| 2,909,742 | 10/1959 | Lambenton | 336/212 |
| 2,947,957 | 8/1960 | Spindler | 336/61 |
| 2,990,524 | 6/1961 | O'Meara et al. | 336/69 X |
| 3,179,908 | 8/1960 | Peabody | 336/61 |
| 3,287,670 | 11/1966 | Schroeder | 336/61 |
| 3,428,928 | 2/1969 | Maines | 336/61 |
| 3,621,425 | 11/1971 | Trench | 336/61 |
| 3,728,655 | 4/1973 | Reinke | 336/62 |
| 4,134,091 | 1/1979 | Rogers | 336/175 X |

FOREIGN PATENT DOCUMENTS 0273171 7/1988 European Pat. Off. .
3505120 10/1986 Fed. Rep. of Germany .
1453154 10/1976 United Kingdom .

Primary Examiner—Thomas J. Kozma
Attorney, Agent, or Firm—Cushman, Darby & Cushman

[57] ABSTRACT

The invention provides an electromagnetic device such as a transformer which comprises one or more electrically conductive windings in a cylindrical magnetic frame. The magnetic frame defines a magnetic flux path having a length which is less than the length of the portion of the windings enclosed by the magnetic frame, and the device includes heat dissipation elements disposed about the windings and extending transversely from the windings. The magnetic frame comprises a number of toroidal core sections which are stacked end to end, so that the magnetic frame has an elongate tubular form. The heat dissipation elements are plates located between adjacent core sections.

8 Claims, 1 Drawing Sheet

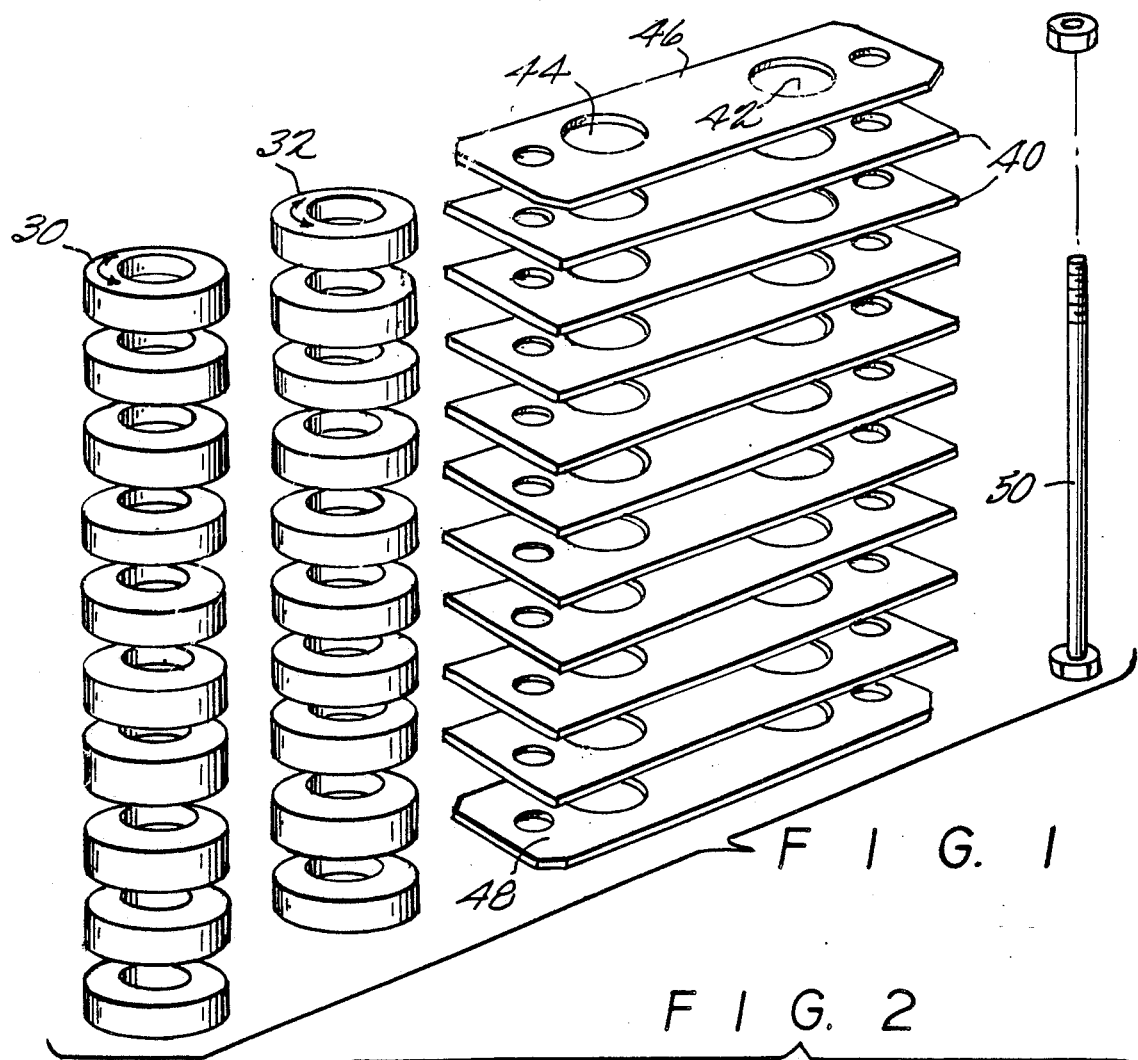
FIG. 1
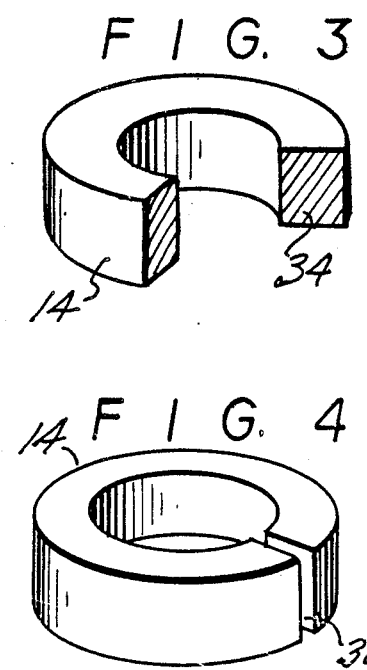
FIG. 3
FIG. 4
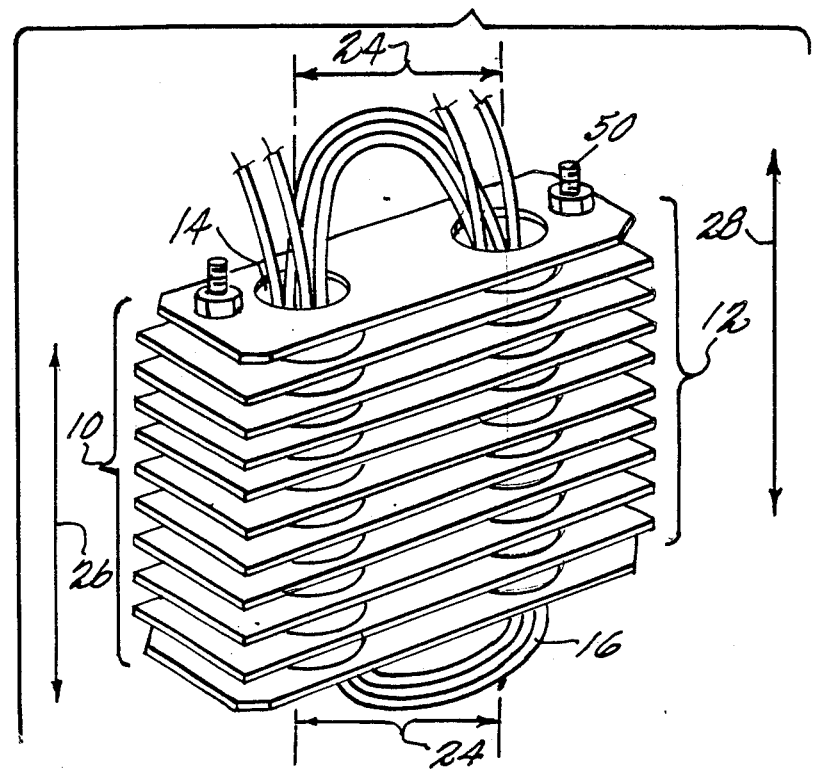
FIG. 2

COOLING ELECTROMAGNETIC DEVICES

BACKGROUND OF THE INVENTION

This invention relates to an electromagnetic device.

Electromagnetic devices such as transformers or chokes typically comprise one or more conductive windings for electric current and a magnetic frame, usually referred to as a core, in which magnetic flux due to current in the windings is concentrated.

In order to increase the operating efficiency of such devices, particularly transformers, it has become commonplace to use specially formulated ferro-magnetic strip material shaped in the form of a toroidal core, with conductive windings disposed helically around the core.

While the length of the magnetic flux path in the core of such a transformer will be long relative to the effective length of the portion of the windings inducing magnetic flux, such transformers are relatively efficient and have a very low radiated magnetic fluid.

In high power applications, for example, in transformers which are used in electrical substations or in other power distribution systems, heat dissipation within the core and windings of the transformer may be problematic, and such large transformers are usually oil cooled. This, of course, increases the cost and complexity of the transformer.

SUMMARY OF THE INVENTION

According to the invention an electromagnetic device comprises one or more electrically conductive windings and a cylindrical magnetic frame disposed about the windings and substantially co-axial with the portion of the windings enclosed thereby, the magnetic frame defining a magnetic flux path having a length which is less than the length of the portion of the windings enclosed by the magnetic frame, the device including one or more heat dissipation elements disposed about the windings and extending transversely from the windings.

The electromagnetic device may be, for example, a transformer, a reactor, a choke or a transductor.

The heat dissipation elements may be of a non-magnetic material, such as copper, aluminium, or a thermally conductive ceramic material.

The magnetic frame may comprise a number of toroidal core sections arranged co-axially, to form an elongated magnetic frame.

Each core section is preferably formed from a strip of magnetic material which is wound spirally to form a toroid.

BRIEF DESCRIPTION OF THE DRAWINGS

FIG. 1 is an exploded schematic illustration of a transformer according to the invention;

FIG. 2 is a schematic illustration of the assembled transformer;

FIG. 3 is a partially sectioned view of a single core section of the transformer of FIGS. 1 and 2; and FIG. 4 is a view of a core section similar to the core sections of FIGS. 1 and 2 but incorporating a gap in the magnetic flux path.

DESCRIPTION OF AN EMBODIMENT OF THE INVENTION

Referring to FIGS. 1 and 2 a transformer comprises two cylindrical magnetic frames 10 and 12, each of which comprises then co-axially arranged ferro-magnetic toroidal core sections 14. The core sections 14 are typically wound from a strip of ferro-magnetic material such as transformer strip steel laminate, in a spiral form, to form the toroidal core sections. Alternatively, the core sections 14 can be made of a suitable ferrite material, as is frequently used in transformers intended for high frequency applications.

Windings 16 pass through the magnetic frames 10 and 12. The windings include a primary and secondary winding, with respective conductors 18 and 20. Portions 26 and 28 of the windings 16 are enclosed by the respective magnetic frames 10 and 12. The portions 22 and 24 of the windings 16 are not enclosed. The enclosed portions 26 and 28 are generally co-axial with the respective magnetic frames 10 and 12. The magnetic flux in the frames 10 and 12 flows circumferentially in the core sections 14, as illustrated by the arrows 30 and 32.

Flat, rectangular heat dissipation elements 40 are located between adjacent core sections 14 of the magnetic frames. The heat dissipation elements are formed from a material which can be different from the material of the core sections. Preferably, the material of the heat dissipation elements is nonmagnetic, and may be a metal having good thermal conductivity, such as copper or aluminium. Alternatively, the heat dissipation elements may be formed from a thermally conductive ceramic material. Each heat dissipation element 40 has a pair of apertures 42 and 44 formed therein, which correspond in size to the central openings in the core sections 40. When the electromagnetic device is assembled, as shown in FIG. 2, the apertures in the heat dissipation elements are aligned with the openings in the core sections, allowing the conductors to pass through the magnetic frames. At each end of the frames 10 and 12 are plates 46 and 48 which are held together by means of long bolts 50. When the bolts 50 are tightened, the core sections of the magnetic frames are pressed tightly together, holding the core sections and the heat dissipation elements in close contact with one another. This facilitates the transfer of heat from the windings and the core sections to the heat dissipation elements.

FIG. 3 is a partial sectional view of a single toroidal core section 14, wound spirally from ferro-magnetic material such as transformer strip steel laminate 34. The induced alternating or fluctuating magnetic flux in the toroidal core element results in heat losses which may be minimised by the choice of the strip material or by reducing the flux path length, the latter being preferred in this embodiment. It will be appreciated that in this type of core section construction, the height of the core section 14 together with its inner and outer diameters, can be readily varied according to the requirements of the transformer design.

The illustrated transformer has various advantages over conventional transformers using "core", "shell", "pot" and conventional toroidal type magnetic frames. The magnetic flux paths 30 and 32 are relatively short compared with the lengths of the portions 26 and 28 of the windings 16 enclosed by the frames 10 and 12. The "non-working" portions 22 and 24 of the windings 16 are relatively short compared with the length of the "working" portions 26 and 28. This results in a transformer with low magnetic losses and high operating efficiency. (The "non-working"0 portions of the windings are defined as the portions of the windings not enclosed by and external to the magnetic frames, and therefore not producing any useful flux in the magnetic frames. The "working" portions of the windings 16 are defined as the portions enclosed by and substantially co-axial with the magnetic frames, and therefore able to produce useful flux in the magnetic frames).

The bulk of the windings 16 are completely enclosed by the magnetic frames 10 and 12, so that the magnetic coupling between the windings will be exceptionally good and the leakage flux exceptionally low.

The toroidal core sections could comprise a relatively small variety of different sizes and would therefore be economical to produce. A large number of different transformer ratings may therefore be produced simply by varying the number of core sections 14 comprising the magnetic frames 10 and 12.

The embodiment described above finds application in general electrical power distribution and transformation. While unusual in shape in a conventional sense, the elongated shape of the transformer would find ready application in pole mounted distribution and stepdown transformers and in sub-stations. The described transformer is much cheaper to manufacture than a similarly rated oil-cooled transformer.

The required turns-per-volt may be reduced by increasing the operating frequency of the transformer, thereby reducing the electrical resistance of the windings 16. While high frequency operation increases the magnetic losses in the core, these will be offset by the method employed in this embodiment to reduce the magnetic flux path. High frequency operation is accomplished by feeding the transformer from the output of an inverter or chopper converter, in place of the conventional mains electrical supply. With careful design, high frequency operation up to middle audio frequencies may be achieved with conventional transformer strip steel toroidal core elements in the transformer.

Due to the shortened magnetic flux paths 30 and 32, the surface area of the magnetic frame elements is reduced and this may impair their capacity to dissipate the heat generated within them during operation by conventional radiation/convection. For this reason, heat dissipation is improved by incorporating the heat dissipation elements or heat sinks 40. Heat generated in the windings or the core sections of the electromagnetic device is transferred by conduction to the heat sinks 40 and then by radiation/convection from the heat sinks 40 to ambient.

The windings 16 may comprise individually insulated electrical winding wires, conducting bars, hairpin loops and hairpin loops joined end to end to form a continuously "wound" conductor. The windings may be spun or drawn. The windings 16 would be supported by suitable formers to protect them and to prevent them coming into direct contact with the frame elements 10 and 12.

Chokes and reactors may be constructed as well as transformers. FIG. 4 shows a core section similar to the core sections shown in FIGS. 1 and 2, except that provision has been made for a gap 36 in the flux path. The gap is incorporated during manufacture and may be varied simply by applying appropriate pressure around the circumference of the core section against the natural tendency for the core section to expand. Such pressure and resulting movement of the core section must be limited to prevent work-hardening of the magnetic material which can considerably impair the magnetic properties of the core section.

Placement of the windings 16 to form the transformer may be accomplished by threading the winding wires through the hollow portions of the magnetic frames 10 and 12 of FIG. 1, turn-by-turn. Alternatively, the coils of wire may be pre-formed into windings first, and thereafter the magnetic frames, which would have been split by means of an airgap during their manufacture, similar to the gap 36 in FIG. 4, are opened gently to prevent work-hardening of the magnetic material of which they are made and the coils passed via the opened gap into position. The gap is then closed. The gaps in the individual laminations 34 of the toroidal core sections 14 could then be staggered about the full circle described by the core elements to reduce the possible adverse effects these may have on the magnetic properties of the core elements.

I claim:

1. An electromagnetic device comprising:
   at least one electrically conductive winding;
   at least two elongate tubular magnetic frames disposed side by side and substantially enclosing said at least one electrically conductive winding;
   each frame comprising a plurality of substantially toroidal core sections which are stacked end to end, a portion of said electrically conductive winding extending through each of said core sections, and defining a magnetic flux path having a length which is less than the length of the portion of said electrically conductive winding enclosed thereby; and
   at least one common heat dissipation element located between adjacent core sections in each of said frames, said element in common with each of said frames and extending therebetween, and further extending transversely beyond said core sections.

2. An electromagnetic device according to claim 1 wherein the heat dissipation elements are plates which lie substantially in planes which extend transversely to respective longitudinal axes of said magnetic frames.

3. An electromagnetic device according to claim 2 wherein the plates forming the heat dissipation elements are made of flat sheet material, each heat dissipation element defining at least one aperture corresponding to openings in said core sections, the at least one aperture in the heat dissipation elements being aligned with the openings in said core sections.

4. An electromagnetic device according to claim 1 wherein each core section is formed from a strip of magnetic material which is wound spirally to form a toroid.

5. An electromagnetic device according to claim 1 wherein each core section is formed of a ferrite material.

6. An electromagnetic device according to claim 1 wherein at least one core section is provided with a radially extending flux gap.

7. An electromagnetic device according to claim 1 wherein the heat dissipation elements are made of a non-metallic material.

8. An electromagnetic device according to claim 7 wherein the material of the heat dissipation elements is a thermally conductive ceramic material.

* * * * *